(No Model.)
M. M. ESTEE.
CULTIVATOR.
No. 304,811. Patented Sept. 9, 1884.
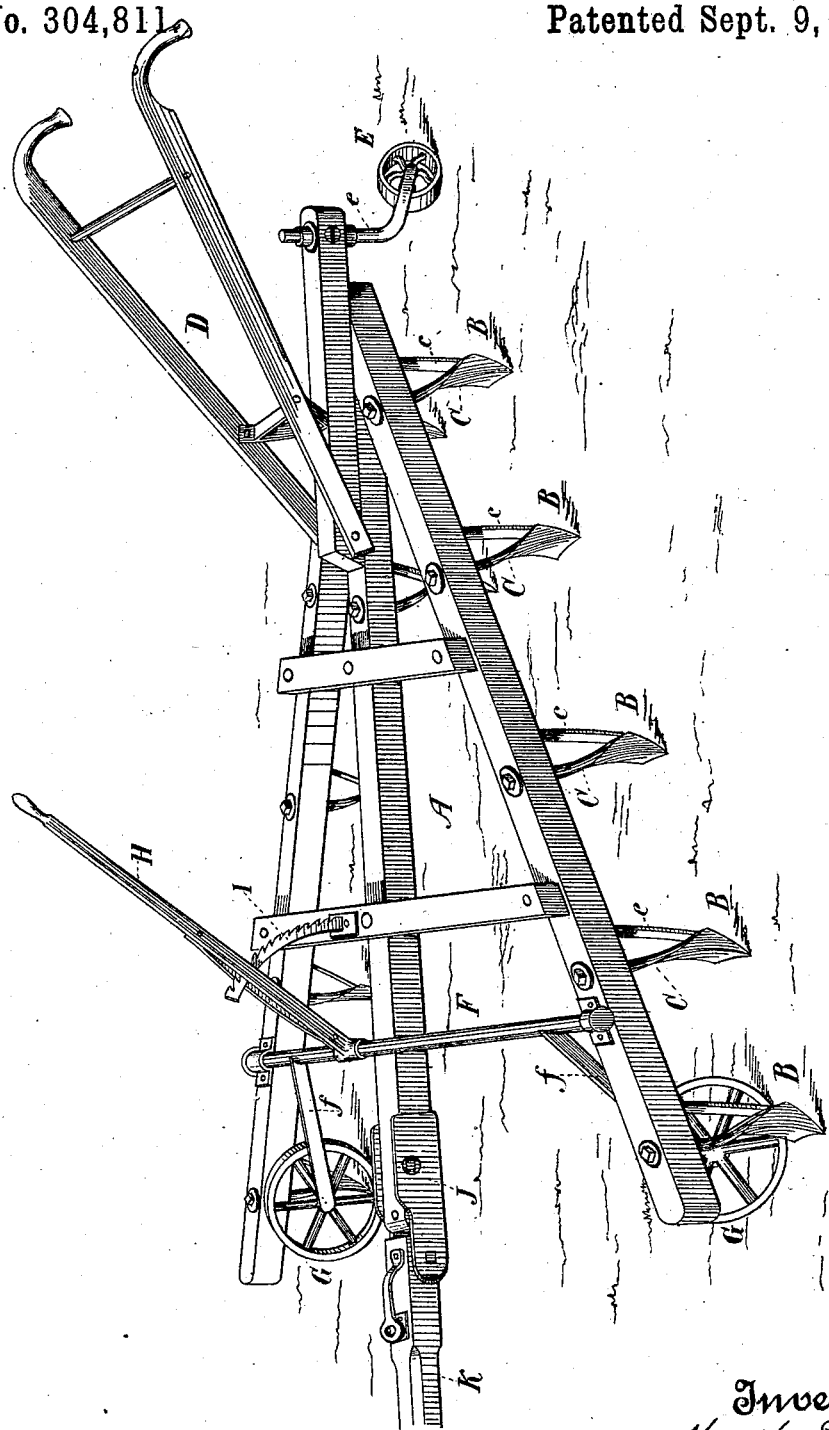
Witnesses,
Geo. H. Strong
J. H. Rouse
Inventor,
M. M. Estee
By Dewey & Co
Attorneys

UNITED STATES PATENT OFFICE.

MORRIS M. ESTEE, OF NAPA CITY, CALIFORNIA.

CULTIVATOR.

SPECIFICATION forming part of Letters Patent No. 304,811, dated September 9, 1884.

Application filed April 19, 1884. (No model.)

*To all whom it may concern:*

Be it known that I, MORRIS M. ESTEE, of Napa City, county of Napa, and State of California, have invented an Improvement in Cultivators; and I hereby declare the following to be a full, clear, and exact description thereof.

My invention relates to that class of agricultural implements known as "cultivators;" and it consists in a new and useful cultivator, the novelty in which lies in the arrangement of teeth, the side series of which converge to the rear, and are carried by a suitable frame, whose sides likewise converge rearwardly. The attachment of the handles to the rear of the frame, the attachment of the pole to its front, and arrangement of crank-axle and wheels, in connection with the frame, are points of novelty which are included in my invention, and all of which I shall hereinafter fully explain.

The object of my invention is to provide a simple, effective, and easily-handled cultivator.

Referring to the accompanying drawing, the figure is a perspective view of my cultivator.

A is the frame, consisting, mainly, of side bars converging rearwardly, a center bar, and suitable cross-bars.

B are the teeth supported by and under the side bars of the frame by means of standards C, braced by strips c. The side series of teeth, it will be seen, also converge to the rear.

D are the handles, bolted to the rear of the frame, and E is a rear steering or tiller wheel, mounted in a suitable swiveled and vertically-adjustable standard, e. Across the frame, toward its wide front, is journaled an axle, F, provided with cranks f near each end, upon which are mounted the wheels G, which are located inside of the side bars of the frame.

H is a lever connected with axle F, and adapted in suitable manner to engage with a rack, I, on a cross-bar of the frame. The upward movement of this lever raises the frame and throws the teeth out of the ground, and its downward movement effects an opposite result. By it also the depth of the teeth in the ground may be regulated—an object which may likewise be secured by the vertically-adjustable standard of the tiller-wheel. Pivoted to the forward end of the central bar of the frame is a clevis or link, J, to which the pole K is suitably attached.

The peculiar shape of the frame—namely, a divergence of its sides to the front and the location of the pivot or steering wheel at the rear—enables the driver to turn the implement in a very narrow space and easily, while the crank-axle, by throwing the teeth clear of the ground, prevents any accident to them while turning. Having its wide part traveling foremost, the complete pulverizing of the earth is better insured, because the clods are gathered in and met by the teeth, instead of being rolled away outward, as with ordinary cultivators. The divergence of the side series of teeth to the front is advantageous in enabling the driver to run close to the rows in a vineyard or orchard with safety and accuracy—with safety because of the location of the teeth outside of the plane of the wheels, and with accuracy because of the ready guide which the foremost teeth afford by enabling him to see at once how close he can go, determining his distance by said teeth without reference to the succeeding ones. This result cannot be effected when the frame is built in a reverse manner, as is usually the case, because his front tooth, being in the longitudinal center of the frame, and consequently some distance from the rows, is too uncertain a guide to determine where the rearmost and more widely-separated teeth will run. Having a pole, the implement runs steadily and is easily managed, as the tiller-wheel enables it to be guided by a very little effort.

The whole implement combines strength, utility, and lightness of draft.

Harrows may be arranged in this manner, the only difference between harrow and cultivator being in the teeth.

Having thus described my invention, what I claim as new, and desire to secure by Letters Patent, is—

A cultivator consisting of a frame the sides of which carry teeth and converge rearwardly, and having suitable handles at its rear, a sectional or hinged pole at its front, a caster or steering wheel at the rear of the frame, suitable carrying-wheels mounted upon the cranks of an axle between the sides of the frame near its front, and an operating-lever on the frame, substantially as herein described.

In witness whereof I have hereunto set my hand.

MORRIS M. ESTEE.

Witnesses:
S. H. NOURSE,
H. C. LEE.